United States Patent [19]

Phipps

[11] 3,916,604
[45] Nov. 4, 1975

[54] EQUESTRIAN TRAINING SADDLE

[76] Inventor: Ulysses S. Phipps, Box 653, Miller Star Rte., Tucson, Ariz.

[22] Filed: Nov. 20, 1974

[21] Appl. No.: 525,380

[52] U.S. Cl. .................................... 54/44; 54/46
[51] Int. Cl.² ........................................ B68C 1/00
[58] Field of Search ................... 54/44, 46, 37, 71

[56] References Cited
UNITED STATES PATENTS

| 1,214,364 | 1/1917 | Peterson | 54/46 |
| 3,112,592 | 12/1963 | Schindler | 54/44 |
| 3,234,710 | 2/1966 | Gauthier | 54/44 |
| 3,312,040 | 4/1967 | Nuzzo | 54/44 |

Primary Examiner—Robert Peshock
Assistant Examiner—J. Q. Lever
Attorney, Agent, or Firm—Cahill, Sutton & Thomas

[57] ABSTRACT

An equestrian training saddle, having a downwardly opening cavity, mates with and is supported by the horn and pommel of a full sized saddle. The training saddle does not impinge upon the seat or skirt of the supporting saddle such that both saddles may be simultaneously occupied whereby a child can be given continuous and immediate instruction in horsemanship.

9 Claims, 4 Drawing Figures

EQUESTRIAN TRAINING SADDLE

The present invention relates to apparatus for teaching horsemanship and, more particularly, to equestrian training saddles for children.

Teaching horsemanship to small children is generally quite difficult for several reasons. A small child cannot be properly seated within a standard sized saddle nor can he effectively use the stirrups. Thus, the child cannot readily develop the correct body movement and he might easily become dismounted unless he holds onto the horn. Instruction in reining the horse is generally limited by the instructor who either walks beside the horse to be in a position to grasp the reins should an emergency occur or uses a tether of some sort. In the former case, the type of riding that can be taught is generally limited by the instructor's physical capability. In the latter case, the tether tends to impinge upon or derogate from the control being exercised by the child through the reins.

The following U.S. Patent Nos. are representative of the prior art: 1,214,364, 2,252,971, 3,112,592 and 3,234,710.

It is therefore a primary object of the present invention to provide a means for personally instructing a child through all phases of horsemanship.

Another object of the present invention is to provide means for teaching a small child horsemanship through continuous and personal instruction in the field.

Still another object of the present invention is to provide a training saddle which is physically compatible with the physique of a small child yet mountable upon normal sized horses.

Yet another object of the present invention is to provide a training saddle for a child attached to and supported by the horn and pommel of a full sized saddle.

A further object of the present invention is to provide a training saddle for a small child which permits both the child and an adult to be simultaneously mounted upon the same horse and without impeding each other's movements.

A still further object of the present invention is to provide an easily detachable training saddle for use in conjunction with any standard sized saddle.

These and other objects of the present invention will become apparent to those skilled in the art as the description thereof proceeds.

The present invention may be understood with greater clarity and specificity with reference to the following drawings, in which.

Figure 1:
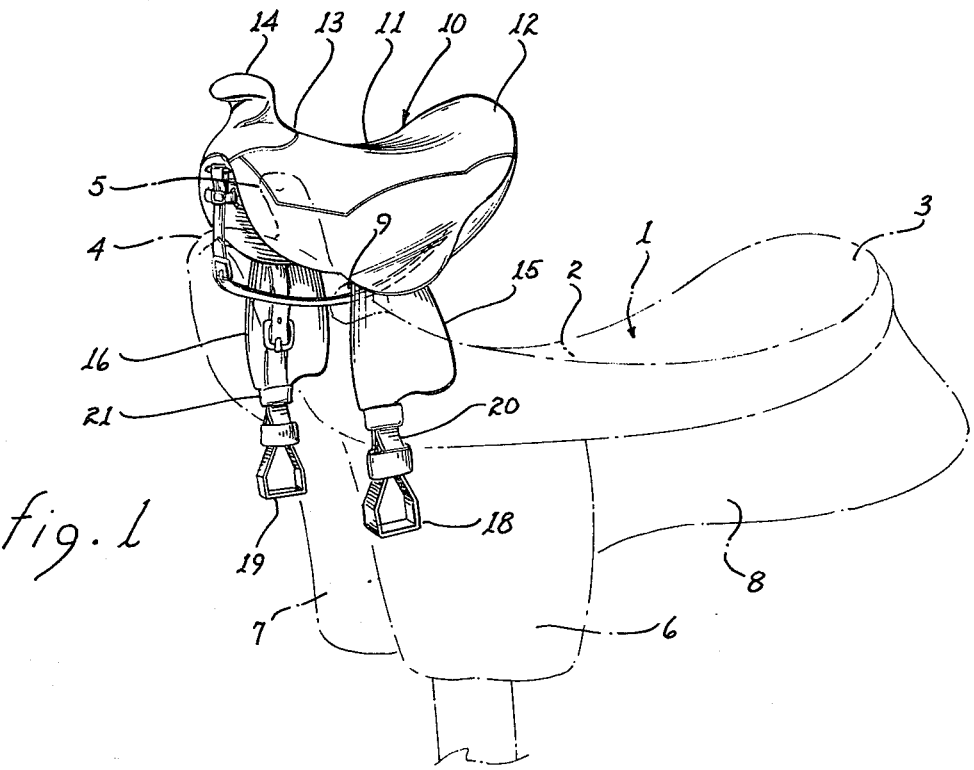
FIG. 1 is a perspective view of a training saddle constructed in accordance with the present invention and mounted upon a standard sized saddle.

A full sized saddle 1 of the western type is depicted in FIG. 1. It is formed by a seat 2 terminating at the rear by a cantle 3 and at the front by a pommel 4 and horn 5. Stirrup assemblies 6 and 7 generally extend downwardly from beneath seat 2 and adjacent skirt 8. One or more cinch straps extend downwardly from the saddle for attachment about the horse.

The training saddle 10 will be described with joint reference to FIGS. 1, 2, 3 and 4. It includes a seat 11, cantle 12, pommel 13 and horn 14, all of diminutive size commensurate with the physique of a young child. Stirrup assemblies 15 and 16 extend downwardly to provide support for the child's legs. The stirrups 18 and 19 can be adjusted to accommodate most young children by means of straps 20 and 21. Thereby, the child can be taught to use his legs for balance and support.

Figure 2:
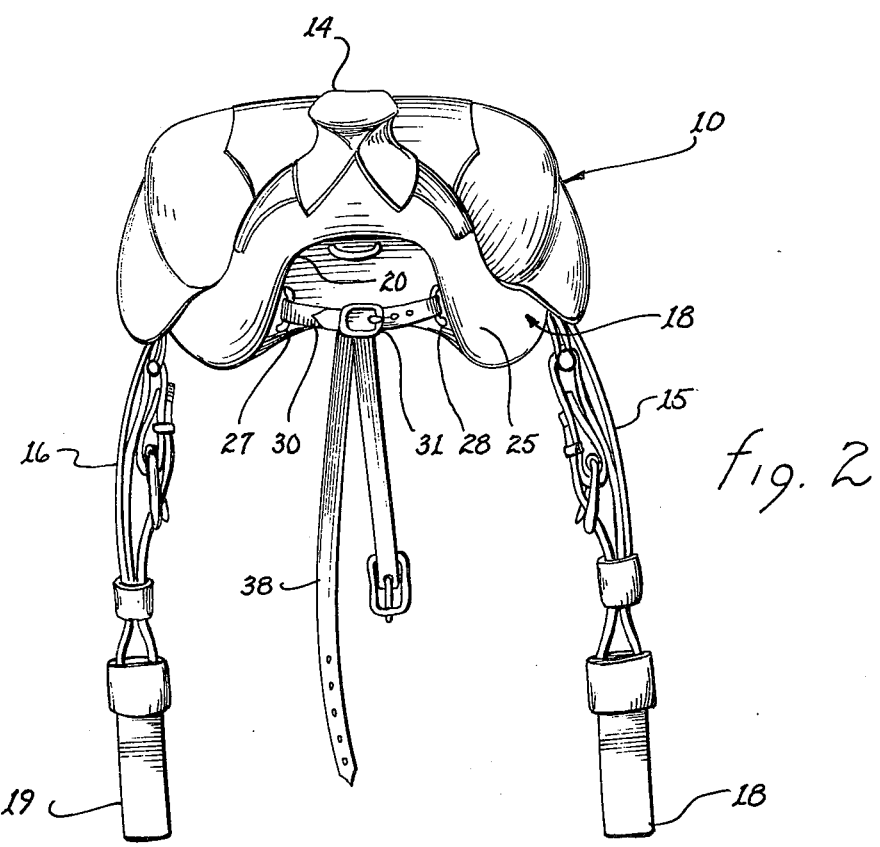
FIG. 2 is a front view of the training saddle.
Figure 3:
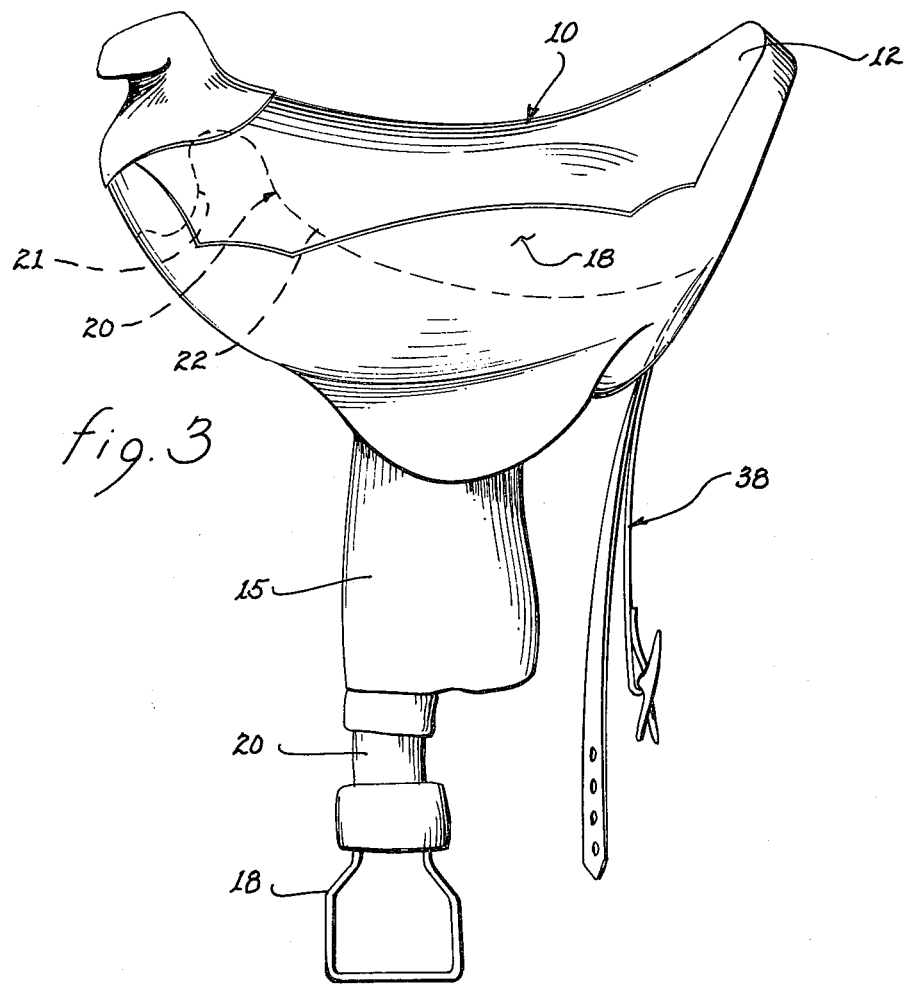
FIG. 3 is a side view of the training saddle.
Figure 4:
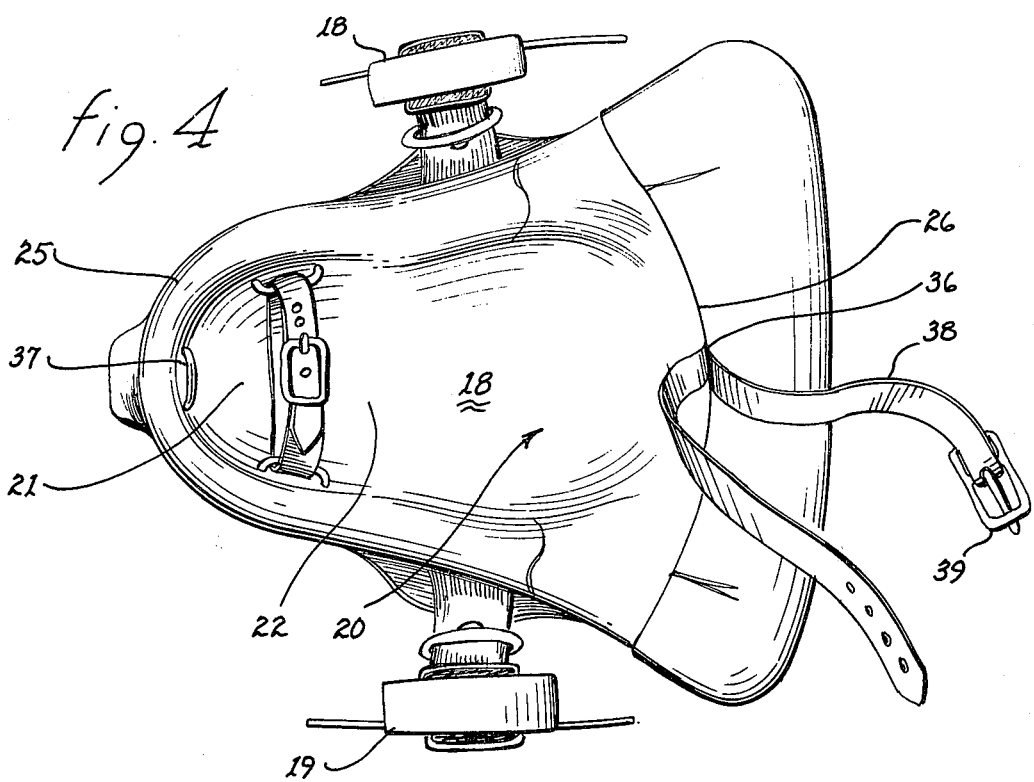
FIG. 4 is a bottom view of the training saddle.

The structure of saddle 10 will be described with particular reference to FIGS. 2, 3 and 4. The foundation 18 of saddle 10 may be formed of formable hardenable material such as plastic or a plaster casting. Alternatively, the foundation may be formed of a framework of wood or metallic elements. However the foundation is formed, it is necessary that there be included a cavity for receiving and mating with the horn and pommel of the supporting saddle.

The foundation is formed of cast plaster having a longitudinally oriented trough 20. A recess 21 is disposed within the fore part of trough 20 to receive the horn of the supporting saddle. A molded depression 22 within the fore part of trough 20 generally matches the curve and slant of the pommel of the supporting saddle. For the sake of weight reduction, trough 20 extends to the rear of the saddle. The structure of the saddle itself, as defined above, is added to or suspended from foundation 18 to obtain a replica in both appearance and function of a full sized saddle.

A pair of anchor points 27 and 28 are disposed at opposite sides of trough 20 in proximity to forward end 25 of foundation 18. A strap 30, having a buckle 31, extends from the anchor points around the forward edge of horn 5 (see FIG. 1) of the supporting saddle to prevent rearward movement of training saddle 10.

A further pair of anchor points 36 and 37 extend downwardly from the rearward and forward ends 26, 25, respectively, of foundation 18. A strap 38, having a buckle 39, extends from anchor point 36 through tuttle 9 (see FIG. 1) of the supporting saddle to anchor point 37 to prevent upward movement of the training saddle.

From the above description of training saddle 10, it may be appreciated that pivotal movement of the training saddle about the vertical axis is generally inhibited by the mating of foundation 18 with the horn and pommel of the supporting saddle. Rearward pivotal movement of the training saddle is generally prohibited by strap 30 extending across the fore part of the horn of the supporting saddle. And, upward vertical movement is generally prevented by strap 38 extending through the tuttle of the supporting saddle. Thus, training saddle 10 has no more freedom with respect to the mounted horse than that of the supporting saddle 1. Hence, all movements of the horse which are normally transmitted to a saddle will be equally transmitted to the training saddle and the child will receive all sensations of movement normally received by a horseman.

By further inspection of the mounting of training saddle 10 upon the supporting saddle 1, as shown in FIG. 1, it may be appreciated that the training saddle does not extend rearwardly much beyond the pommel of the supporting saddle. Hence, the training saddle does not encroach upon the seating space within the supporting saddle. Further, the training saddle does not extend laterally downwardly to a sufficient degree to impinge upon the normal space requirements for the thighs and legs of a rider mounted upon the supporting saddle. Thus, both the supporting saddle and the training saddle 10 may be simultaneously occupied without either occupant or his saddle impinging upon or otherwise restricting the other rider's space requirements and movements.

Through use of the present invention, it now becomes feasible and practical to instruct young children in the art of horsemanship without imposing restrictions of where and how the child must ride and still be under control of an instructor. Instead, a young child can be taught the rudiments and finer points of riding and reining a horse under constant tutelage. Any kind of terrain can be traversed as the instructor is continuously present. And, the danger of runaways, loss of control, or falling are practically eliminated as the instructor is always present to handle any emergency.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. An equestrian training apparatus for small children, said apparatus comprising in combination:
   a. a full sized saddle having at least a pommel and a tuttle;
   b. a training saddle having a seat, cantle, pommel and stirrups, of proportions commensurate with a small child and mounted upon a base, said training saddle including a downwardly opening depression disposed within said base for receivingly mating with the pommel of said full sized saddle to position said training saddle upon the pommel of said full sized saddle and to establish positional orientation therebetween; and
   c. strap means interconnecting said training saddle and said full sized saddle to prevent independent movement therebetween; whereby, said training saddle is mounted forward of the seat of said full sized saddle such that both said training saddle and said full sized saddle may be occupied simultaneously to afford the opportunity to provide a child with continuous verbal and physical instruction in horsemanship.

2. The apparatus as set forth in claim 1 wherein said full sized saddle includes a horn and said base includes a cavity for receivingly mating with said horn.

3. The apparatus as set forth in claim 1 wherein said strap means includes a first strap and buckle extending across a front part of said full sized saddle to prevent rearward tilting of said training saddle and a second strap and buckle extending from the front to the rear of said training saddle through said tuttle of said full sized saddle.

4. A training saddle for small children mountable upon the pommel of a full sized saddle, said training saddle comprising:
   a. a base, said base having mating means for engaging the pommel of the full sized saddle;
   b. a seat, cantle, pommel and stirrups mounted on said base and of a size commensurate with the physique of a small child; and
   c. strap means extending from said base for attaching said training saddle in proximity to the pommel of the full sized saddle without impinging upon the seat of the full sized saddle; whereby, a small child may be mounted upon said training saddle and receive continuous and complete instruction in horsemanship from an occupant of the full sized saddle.

5. The training saddle as set forth in claim 4 wherein said base includes a cavity for receiving the horn of the full sized saddle.

6. The training saddle as set forth in claim 5 wherein the full sized saddle includes a tuttle and said strap means comprises a first strap extending across the horn of said full sized saddle and a second strap extending through the tuttle of the full sized saddle.

7. The training saddle as set forth in claim 4 wherein said mating means comprises a depression, said depression being configured to mate with the pommel of the full sized saddle.

8. The training saddle as set forth in claim 4 wherein said mating means comprises a longitudinally oriented downwardly opening trough having an indentation for receiving the pommel of the full sized saddle.

9. The training saddle as set forth in claim 8 wherein said strap means includes a first strap extending across the front of said trough and a second strap extending along the longitudinal axis of said trough.

* * * * *